Jan. 14, 1964 R. D. BREMER 3,118,043
DOMESTIC ELECTRIC HEATING ELEMENT
Filed Aug. 16, 1960 2 Sheets-Sheet 1

INVENTOR.
Robert D. Bremer
BY
Frederick M. Ritchie
His Attorney

Jan. 14, 1964     R. D. BREMER     3,118,043
DOMESTIC ELECTRIC HEATING ELEMENT

Filed Aug. 16, 1960     2 Sheets-Sheet 2

INVENTOR.
Robert D. Bremer
BY Frederick M. Ritchie
His Attorney

United States Patent Office 3,118,043
Patented Jan. 14, 1964

3,118,043
DOMESTIC ELECTRIC HEATING ELEMENT
Robert D. Bremer, Dayton, Ohio, assignor to General Motors Corporation, Detroit, Mich., a corporation of Delaware
Filed Aug. 16, 1960, Ser. No. 49,874
3 Claims. (Cl. 219—20)

This invention relates to a domestic appliance and more particularly to an improved surface cooking unit for an electric range.

On the electric ranges currently being marketed, there is generally one thermally responsive surface cooking unit—most often one of the large or eight inch units. Consequently, when it is desired to use a small pan or cooking utensil, such as a coffee pot, on a thermally responsive cooking unit, it is necessary to energize the entire eight inch cooking unit. And since the small pan must be substantially centered over the thermally responsive sensing element, the handle thereof frequently becomes overheated. It is to the solution of these and other problems that this invention is directed.

Accordingly, it is an object of this invention to provide a single tubular sheathed cooking unit with means for energizing a portion only of said cooking unit.

A more specific object of this invention is the provision of a monotube tubular sheathed cooking unit with enclosed resistance coils which may be selectively energized to heat an inner portion only of the cooking unit or the entire cooking unit.

Another object of this invention is the provision of a monotube tubular sheathed cooking unit with enclosed coils suitable for selective energization for large or small unit capacity, said selective energization being afforded through an infinite heat switch.

Another object of this invention is the provision of a monotube convolute cooking unit having enclosed resistance coils adapted for selective energization and heating of certain portions only of the cooking unit convolution.

Further objects and advantages of the present invention will be apparent from the following description, reference being had to the accompanying drawings, wherein preferred embodiments of the present invention are clearly shown.

Figure 1:
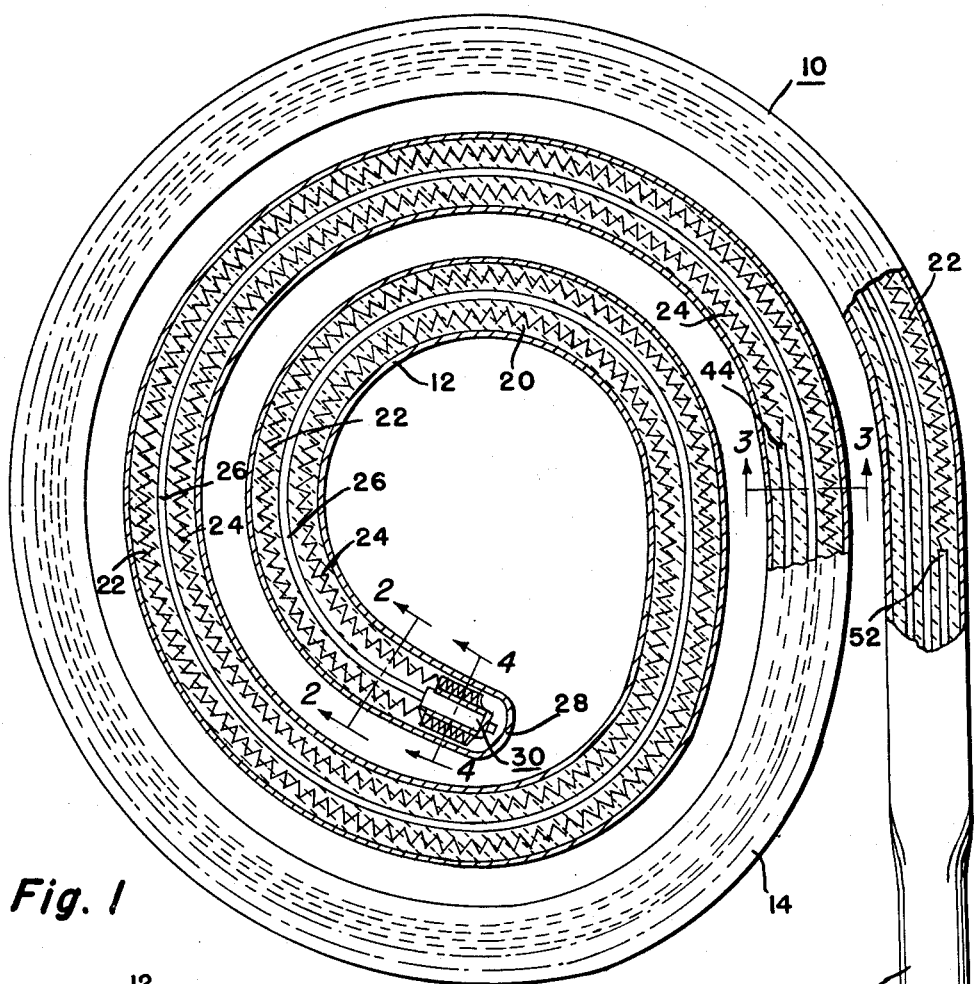
FIGURE 1 is a top elevational view with parts broken away of a monotube tubular sheathed convolute cooking unit.

In accordance with this invention and with reference to FIGURE 1, a convolute tubular sheathed cooking unit 10 is illustrated. The cooking unit 10 is spirally wound in a given plane into a unit which spans approximately eight inches in diameter and is commonly known in domestic electric range art as an eight inch cooking unit. In the prior art, the entire extent of the cooking unit convolutions seen in FIGURE 1 were heated when energized from some power source. This arrangement was satisfactory where a utensil having substantially the same bottom area as the cooking unit 10 was used. However, where small pans are to be used, it is desirable to make the single eight inch cooking unit 10 suitable for use with the small pans as well.

Figure 4:
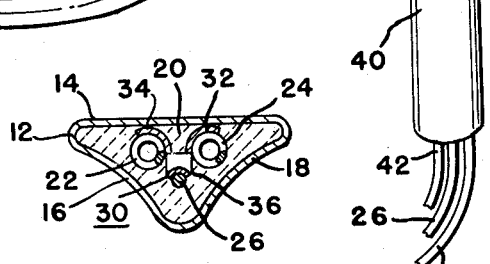
FIGURE 4 is a sectional view taken along line 4—4 of FIGURE 1.

The cooking unit 10 is comprised of a stainless steel tubular sheath 12 which is pressed into a generally triangular cross-sectional area (FIGURE 2) having a flat top surface 14 and concave bottom surfaces 16 and 18. Prior to press forming the tubular sheath 12 into the configuration of FIGURE 2, the tube is filled with a compacted dielectric or insulating material, such as magnesium oxide 20. As the magnesium oxide is placed within the tubular sheath, an outer resistance coil member or electrical conductor 22, a radially inner resistance coil member or electrical conductor 24 and a return wire member or line 26 are positioned in spaced relationship within the sheath 12 except at the terminal end portion or toe section 28 of the sheath 12. At this point, the conductors 22 and 24 and the return line 26 are joined by a junction fitting or connector member 30 best seen in FIGURE 4. The connector member 30 includes an inner coil fastening tab 32 to which the inner resistance coil 24 is welded or otherwise suitably fastened. Similarly, an outer coil adaptor tab 34 is welded to the outer resistance coil 22 and an adaptor tab 36 is welded to the return wire 26. The foregoing structure defines a monotube or single coil tubular sheathed cooking unit which, after the tube is filled, the resistance coils positioned and the tube squared, is wound in convolute fashion to the spiral shape seen in FIGURE 1. After these preliminary operations, the convolutions of the heating element are pressed to the sectional configuration seen in FIGURE 2, except for the round terminal portion 40 of the element which is offset downwardly from the top surface of the unit.

The resistance coils 22 and 24 extend from the inner terminal end 28 of the cooking unit about the convolutions of the unit to the outer electrical connector end 40 which is generally round in cross-section and adapted for interfitting with a terminal connector block of the type taught in the patent to Bremer 2,835,780, issued May 20, 1958.

More particularly, the connector end 40 of the cooking unit houses the lead-in terminals which connect with the resistance coils within the tubular sheath at one end thereof and with a power source through a suitable infinite heat switching arrangement to be described hereinafter, at the other end thereof. More particularly, a radially inner lead-in terminal 42 connects with the inner resistance coil 24 as at 44. Similarly, the lead-in terminal 26 extends completely about the convolutions of the heating element or cooking unit and becomes the return wire. Lastly, the lead-in terminal 50 extends from the electrical connection end 40 of the cooking unit to the point 52, where it is electrically connected to the outer coil 22. Completing the heater assembly, the end of the tubular sheath portion 40 is blocked to prevent the escape of the insulating magnesium dioxide and conventional spade connectors (not shown) are fastened to the lead-in terminals 42, 26 and 50 in accordance with the teachings of the aforementioned Bremer patent.

Figure 2:
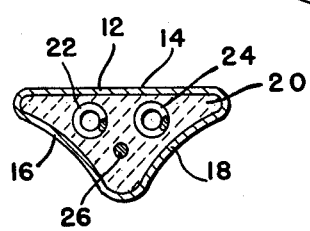
FIGURE 2 is a sectional view taken along line 2—2 of FIGURE 1.
Figure 3:
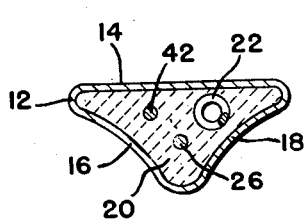
FIGURE 3 is a sectional view taken along line 3—3 of FIGURE 1.

In essence, the outer resistance coil 22 extends entirely about the convolutions of the cooking unit 10 from the electrical supply end 40 to the radially inner end 28 where it is electrically fastened to the connector 30. On the other hand, the inner or six inch coil 24 extends merely from the point 44 in the second convolution from the outside of the cooking unit to the radially inner terminal end 28 of the unit where it connects with the connector piece 30. Lastly, the return wire 26 extends completely from the radially inner end 28 of the convolute unit to the electrical supply end 40 where it joins with and becomes the common or neutral wire for the coil assembly. The section shown in FIGURE 2 illustrates the respective positions of the resistance coils 22 and 24 and return wire 26 and is a typical section through the tubular sheath at all points where the inner and outer coils are in juxtaposition one with the other. FIGURE 3 taken along line 3—3 is a representative section taken along any portion of the cooking unit convolute where but one resistance coil 22 is installed—the remaining two conductors being the low resistance lead-in wires 26 and 42. In summary, it can be said generally that the outer resistance coil 22 defines the large or eight inch cooking unit, whereas the inner resistance coil 24 defines the small or six inch cooking unit.

In operation and with reference to FIGURE 5, a switching arrangement suitable for use with this invention will now be explained. The cooking unit 10 is designed for use with an electric range having a 230 volt power source including electrical power supply leads $L_1$, $L_2$ and N, the neutral. Although the cooking unit 10 may be utilized on a multiple position switch, the operation as it pertains to this invention will be described in connection with an infinite heat switch shown generally at 54. The infinite heat switch 54 is comprised of a small or six inch cooking unit pulsing assembly 56, a large or eight inch cooking unit pulsing assembly 58 and a control knob 60 which is adapted for energizing either the small or short resistance coil 24 or the large or long resistance coil 22. More particularly, the small coil pulsing assembly 56 is comprised of a bimetal 62 connected by means of a conductor 64 with the lead-in terminal 42 of the small coil 24. The bimetal has a fixed end 66 and a movable end 68 having a contact 70 in opening and closing relationship with a fixed contact 72. The contact 72 is connected to the neutral (N) side of the power supply. A heater coil 74 for opening the bimetal switch is positioned adjacent the bimetal 62 and connected as at 76 and 78 to the bimetal to form a parallel electrical flow path between the contacts 70, 72 and the lead-in terminal 42. In order to vary the pulsing rate of the assembly 56, an egg-shaped cam 80 is affixed to a control shaft 82. When the knob 60 is turned counterclockwise to energize the small coil 24, the cam 80 will bias the movable contact 70 into engagement with the fixed contact 72. The pulsing rate of the bimetal 62 will be adjusted in accordance with the temperature or heat output setting along the indicia 84 for the small or six inch cooking unit coil 24, the biasing effect of cam 80 being thereby adjusted.

The pulsing assembly 58, likewise, includes a bimetal 86 having a movable end 88 and a fixed end 90 connected to the lead-in terminal 50 of the large coil 22. The movable end 88 of the bimetal 86 carries a movable contact 92 which opens and closes on a fixed contact 94 electrically connected in turn to the power supply line $L_1$. A heating coil 96 for operating the bimetal 86 is connected as at 98 and 100 in parallel with the bimetal 86 and adapted, when the bimetal is energized, to heat the bimetal, thereby to open and close same. An egg-shaped cam 102 carried on the control shaft 82 is positioned to bias the bimetal 86 downwardly into engagement with the contact 94 when the control knob 60 is rotated clockwise to energize the large or eight inch resistance coil 22—the indicia 104 representing the temperature setting and thus the rate of pulsing required to produce the desired output for the large coil 22.

A master On/Off switch 106 is installed in the infinite heat switch 54 between the power supply line $L_2$ and the lead-in terminal and return line 26 of the cooking unit 10. A round cam 108 biases the switch blade 106 into engagement with a contact 110 whenever the control knob 60 is rotated in either direction.

Let us now assume that an operator desires to prepare food on the cooking unit 10 heated to its fullest extent, i.e., the entire eight inch diameter of the unit. The operator may manipulate the knob 60 in a clockwise fashion bringing the particular temperature or heat setting on the indicia 104 in line with the indicator 112. The resistance coil 22 will be energized as follows for 2200 watts at 236 volts. The rotation of knob 60 will close the switch blade 106 on contact 110 and close the bimetal movable contact 92 on fixed contact 94. Power will flow from $L_2$ through the switch blade 106, the contact 110 to the lead-in terminal wire 26. From the connector piece 30, power will flow through the large coil 22 and lead-in terminal 50 to the pulsing assembly 58. In accordance with the heat setting selected, the contact 92 will open and close on the fixed contact 94 selectively to determine the length of time that coil 22 is energized.

Now let us assume that the operator wishes to use a small diameter pan on a large diameter cooking unit, such as 10. In accordance with the teachings of this invention, she will manipulate the knob 60 in a counterclockwise direction to a temperature selection on the knob indicia 84. In so doing, the cam 108 will close the master On/Off switch blade 106 on contact 110. At approximately the same time the cam 80 will bias the bimetal 62 in a manner to close the movable contact 70 on the fixed contact 72, thereby establishing a 118 volt circuit through the small coil 24 for 1100 watt operation. As power flows to the coil 24, so will it flow through the heater 74 of the pulsing assembly 56. The bimetal 62 will heat and the movable contact 70 will move away from the fixed contact 72 to deenergize the small coil 24 and maintain the selected temperature. In accordance with conventional infinite switching arrangements, the contact 70 will open and close on the contact 72 repeatedly so long as the small coil 24 is energized.

Figure 5:
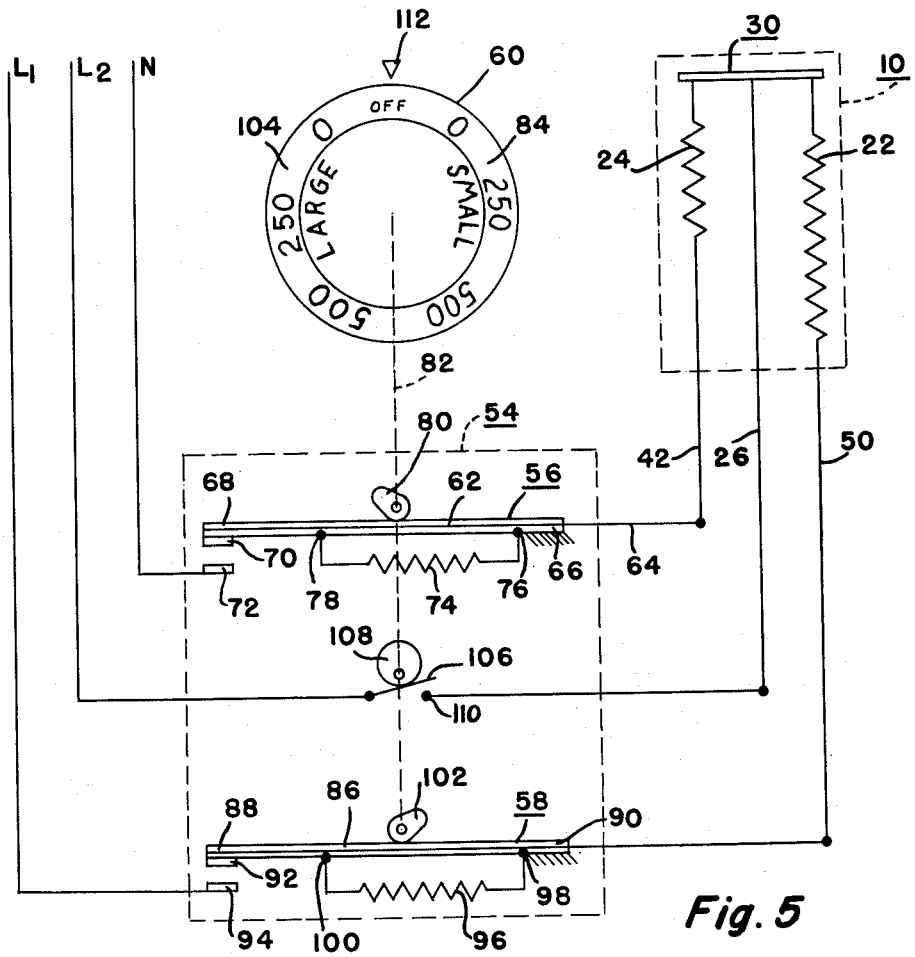
FIGURE 5 is a schematic wiring diagram of an infinite heat switch arrangement suitable for use with this invention.

The coil arrangement shown in FIGURE 1 and FIGURE 5 is the preferred arrangement to produce a combination large and small cooking unit in a single element. In the cooking unit 10, the convolutions of the coil are heated evenly—the inner portion thereof during energization of the small coil and the entire convolution thereof during energization of the large coil 22. However, it may be desirable to provide different coil ararngements to produce desired intensities of heat output for the cooking unit.

Figure 6:
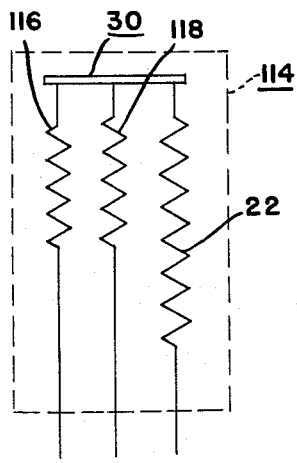
FIGURE 6 is a second embodiment of this invention.

A second embodiment is shown in FIGURE 6 wherein a cooking unit 114 includes the same large outer peripheral coil 22 but in which the inner coil is divided into an inner coil portion 116 connected to the connector piece 30 and a center inner coil portion 118. When the cooking unit 114 is used to replace the cooking unit 10 in the control circuit of FIGURE 5, it should be obvious that the small unit heat is more concentrated at the inner terminal end 28 of the cooking unit since both coils 116 and 118 are heated when the knob 60 is set for small unit operation. With the second embodiment 114 energized for large unit energization, the coil 22 is energized as well as the portion 118 of the small coil. Thus, the inner end portion or toe of the heating unit 114 is again provided with intensified heat—this heat tapering off near the outer periphery of the cooking unit. Admittedly, it is desirable to have even heat distribution over the entire heat emitting surface of the cooking unit but the arrangement of unit 114 may be suitable for certain control switches having need for heat anticipation at the center of the unit.

Figure 7:
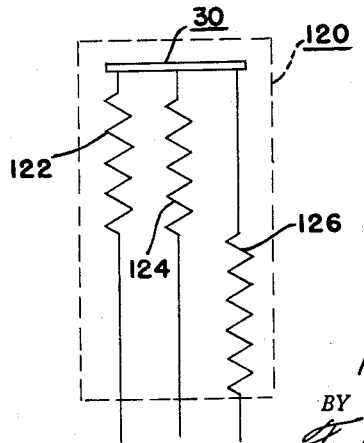
FIGURE 7 is a third embodiment of this invention.

A third embodiment is shown in FIGURE 7 wherein a cooking unit 120 is shown. As with the cooking unit 114, the inner coil is made up of coil portions 122 and 124. However, the outer coil 126 does not lie adjacent the coil portion 124 and even heat distribution is accomplished on the large unit setting of the control knob 60. As with the cooking unit 114, however, the cooking unit 120, on small unit operation, does provide intensified heat at the center of the cooking unit since both coil portions 122 and 124 are energized simultaneously.

Experience with the cooking unit 10 of this invention has shown that the life expectancy of the unit is greater when using a single full length high resistance coil, such as 22, with a full length low resistance straight return wire such as 26. In the prior art it has been common practice to use high resistance coils in side-by-side relationship in the sheath instead of a coil and a return wire. Consequently, it is another aspect of this invention to design a monotube sheathed cooking unit for complete energization only, wherein but one high resistance coil is coextensive with the tube—the return for the power supply in the sheath being accomplished by way of a straight low resistance wire or return leg connected to the coil at the toe end of the cooling unit.

It should now be seen that an improved cooking unit has been provided wherein a single convolute monotube unit may be used to effect either a large eight inch cooking surface or a reduced smaller six inch cooking surface for use with utensils having small bottom areas. With the cooking unit 10 of this invention, only one end 40 of the cooking unit extends below the top surface of the range for connection with an electrical power source. This arrangement improves considerably over the prior art wherein separate coils were interwound in a cooking unit to achieve the large and small unit energization featured in this invention in a single coil or tubular sheath.

While the embodiments of the present invention as herein disclosed, constitute preferred forms, it is to be understood that other forms might be adopted.

What is claimed is as follows:

1. In combination with a power supply having line and neutral conductors, a tubular cooking unit comprising a coplanar convolute outer tube of generally inverted triangular cross-section forming a first cooking surface having a first generally diametrical surface dimension and having a closed inner end and a single power supply end, a first resistance element in a first upper corner of said tube adjacent said first cooking surface extending substantially from said inner end to said power supply end coextensive with said first cooking surface, a second resistance element in a second upper corner of said tube extending from said inner end toward said power supply end a lesser distance than said first resistance element to form a second cooking surface having a second generally diametrical surface dimension less than said first generally diametrical surface dimension and terminating adjacent said second cooking surface short of said power supply end, a lead-in terminal in said second upper corner of said tube and extending from said power supply end into engagement with said second resistance element, a solid return wire in the lower corner of said tube connected to said first and second resistance elements at said inner end and extending substantially from said inner end to said power supply end, and switch means at said power supply end for selectively connecting said first resistance element, said lead-in terminal and said return wire to said power supply for energizing said first or second resistance element, said switch means including a main line switch adapted for series electrical flow relationship with one of said line conductors and said return wire, a first pulsing switch adapted for series electrical flow relationship with another of said line conductors and said first resistance element, a second pulsing switch adapted for series electrical flow relationship with said neutral conductor and said lead-in terminal and means for adjusting said pulsing switches.

2. In combination with a power supply having line and neutral conductors, a tubular cooking unit comprising a coplonar convolute outer tube forming a first cooking surface having a first generally diametrical surface dimension and having a closed inner end and a single power supply end, a first resistance element in a first upper portion of said tube adjacent said first cooking surface extending substantially from said inner end to said power supply end coextensive with said first cooking surface, a second resistance element in a second upper portion of said tube extending from said inner end toward said power supply end a lesser distance than said first resistance element to form a second cooking surface having a second generally diametrical surface dimension less than said first generally diametrical surface dimension and terminating adjacent said second cooking surface short of said power supply end, a lead-in terminal in said second upper portion of said tube extending from said power supply end into engagement with said second resistance element, a return wire in a lower portion of said tube connected to said first and second resistance elements at said inner end and extending substantially from said inner end to said power supply end, and switch means at said power supply end for selectively connecting said first resistance element, said lead-in terminal and said return wire to said power supply for energizing said first or second resistance element, said switch means including a main line switch adapted for series electrical flow relationship with one of said line conductors and said return wire, a first pulsing switch adapted for series electrical flow relationship with another of said line conductors and said first resistance element, a second pulsing switch adapted for series electrical flow relationship with said neutral conductor and said lead-in terminal and means for adjusting said pulsing switches.

3. In combination with a power supply having line and neutral conductors, a tubular cooking unit comprising a coplanar convolute outer tube forming a first cooking surface having a first generally diametrical surface dimension and having a closed inner end and a single power supply end, a first resistance element in a first portion of said tube adjacent said first cooking surface extending substantially from said inner end to said power supply end coextensive with said first cooking surface, a second resistance element in a second portion of said tube extending from said inner end toward said power supply end a lesser distance than said first resistance element to form a second cooking surface having a second generally diametrical surface dimension less than said first generally diametrical surface dimension and terminating adjacent said second cooking surface short of said power supply end, a lead-in terminal in said second portion of said tube extending from said power supply end into engagement with said second resistance element, a return wire in a portion of said tube connected to said first and second resistance elements at said inner end and extending substantially from said inner end to said power supply end, and switch means at said power supply end for selectively connecting said first resistance element, said lead-in terminal and said return wire to said power supply for energizing said first or second resistance element, said switch means including a main line switch adapted for series electrical flow relationship with one of said line conductors and said return wire, a first power pulsing means adapted for series electrical flow relationship with another of said line conductors and said first resistance element, a second power pulsing means adapted for series electrical flow relationship with said neutral conductor and said lead-in terminal and means for adjusting said power pulsing means.

References Cited in the file of this patent

UNITED STATES PATENTS

| | | |
|---|---|---|
| 2,155,425 | La Mere | Apr. 25, 1939 |
| 2,600,605 | Backer | June 17, 1952 |
| 2,765,391 | Shroyer | Oct. 2, 1956 |
| 2,906,845 | Turner | Sept. 29, 1959 |